(12) United States Patent
Gillespie (10) Patent No.: US 11,953,403 B1
(45) Date of Patent: Apr. 9, 2024

(54) STAGGER WHEEL

(71) Applicant: Robert Gillespie, Romulus, NY (US)

(72) Inventor: Robert Gillespie, Romulus, NY (US)

( * ) Notice: Subject to any disclaimer, the term of this patent is extended or adjusted under 35 U.S.C. 154(b) by 0 days.

(21) Appl. No.: 18/490,016

(22) Filed: Oct. 19, 2023

Related U.S. Application Data (60) Provisional application No. 63/380,294, filed on Oct. 20, 2022.

(51) Int. Cl.
*G01M 17/02* (2006.01)
*G01B 3/10* (2020.01)
*G01B 5/02* (2006.01)

(52) U.S. Cl.
CPC ............... *G01M 17/02* (2013.01); *G01B 3/10* (2013.01); *G01B 5/025* (2013.01)

(58) Field of Classification Search
None
See application file for complete search history.

(56) References Cited

U.S. PATENT DOCUMENTS

| | | | | |
|---|---|---|---|---|
| 4,607,436 A | * | 8/1986 | Clay | G01B 3/006 D10/73 |
| 5,412,878 A | * | 5/1995 | Edman | G01B 5/0025 33/810 |
| 5,694,697 A | * | 12/1997 | Curtis | G01B 5/08 33/555.1 |
| 7,007,395 B2 | * | 3/2006 | Douglas | G01B 11/275 33/203.18 |

\* cited by examiner

*Primary Examiner* — Peter J Macchiarolo
*Assistant Examiner* — Jermaine L Jenkins
(74) *Attorney, Agent, or Firm* — Brown & Michaels, PC (57) ABSTRACT

A stagger wheel for quickly determining the left side or right side rear tire outer circumference necessary to achieve a desired amount of stagger.

7 Claims, 8 Drawing Sheets

STAGGER WHEEL

CROSS-REFERENCE TO RELATED APPLICATIONS

This application claims one or more inventions which were disclosed in Provisional Application No. 63/380,294, filed Oct. 20, 2022, entitled "STAGGER WHEEL". The benefit under 35 USC § 119(e) of the United States provisional application is hereby claimed, and the aforementioned application is hereby incorporated herein by reference.

BACKGROUND

The present invention relates to a wheel for measuring stagger of sets of tires quickly.

Stagger is the difference in circumference between the right-side tires and left-side tires on the same end of a vehicle. For example, if the right rear tire is 86.5 inches (219.71 cm) in circumference and the left rear tire connected to the right rear tire along the same axle is 84 inches (213.36 cm) in circumference, the difference between the two tires is a stagger of 2.5 inches (6.35 cm).

Stagger is used in racing to aid the driver in navigating the race track. More specifically, race cars use stagger to turn the car left by making the right rear tire larger than the left rear tire. The correct amount of stagger depends on the radius of the corners and the amount of banking of the track. The tighter the corners or flatter the track, the more stagger that is required. The wider the turns or the more banked the surface, less stagger that is required.

Race teams have a wide selection of different diameter tires for the left side and right side of the axle. Based on the constraints associated with time during pit stops, it is difficult to quickly determine the set of tires needed for a determined amount of stagger.

SUMMARY

According to one embodiment of the present invention, a wheel for measuring stagger is disclosed. The wheel has a first disc connected to a second disk, along a shaft. The first disc and the second disk can rotate independently of each other. The first disc has indicia in increments of 0-10 inches (0-25.4 cm) delineated into increments of 0.0625 inches (0.15 cm). The second disc has indicia of 84 inches (213.36 cm) to 94.5 inches (240.03 cm) in 0.0625 inch increments (0.15 cm).

In another embodiment, the wheel has a first disc connected to a second disk, along a shaft, with the first disk rotating independent from the second disk. The first disk has indicia for 0-10 inches (0-25.4 cm) delineated into increments of 0.125 inch (0.3175 cm) and the second disk has indicia of 84 inches (213.36 cm) to 94 inches (238.76 cm) in 0.125 inch (0.3175 cm) increments.

Methods of quickly determining the outer circumference needed for either the left side or right side rear tire with the associated desired stagger is disclosed.

DETAILED DESCRIPTION

Figure 1:
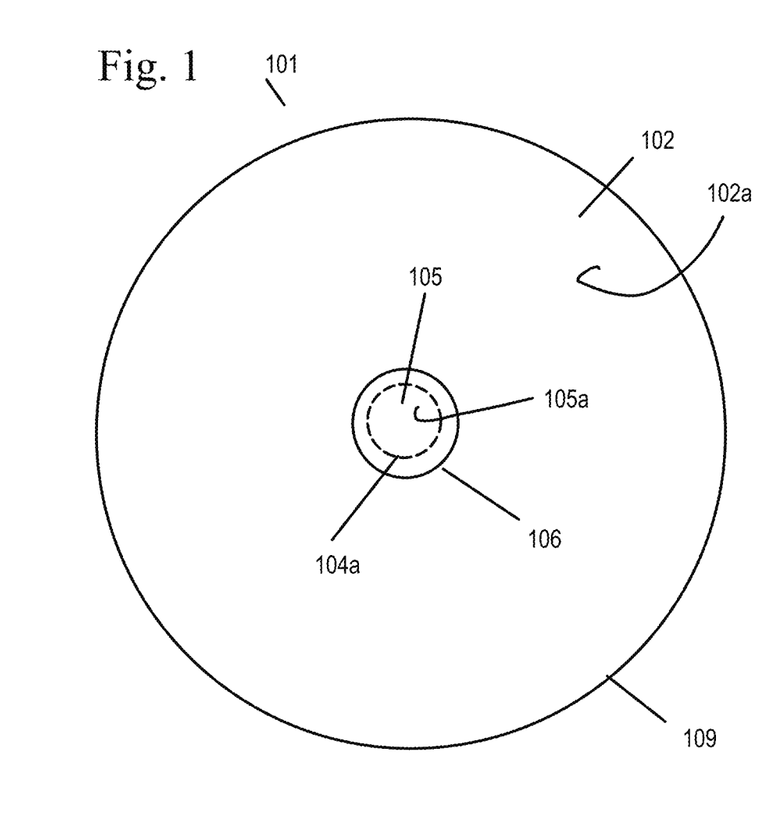
FIG. 1 shows a side view the stagger wheel, showing the first disk.
Figure 2:
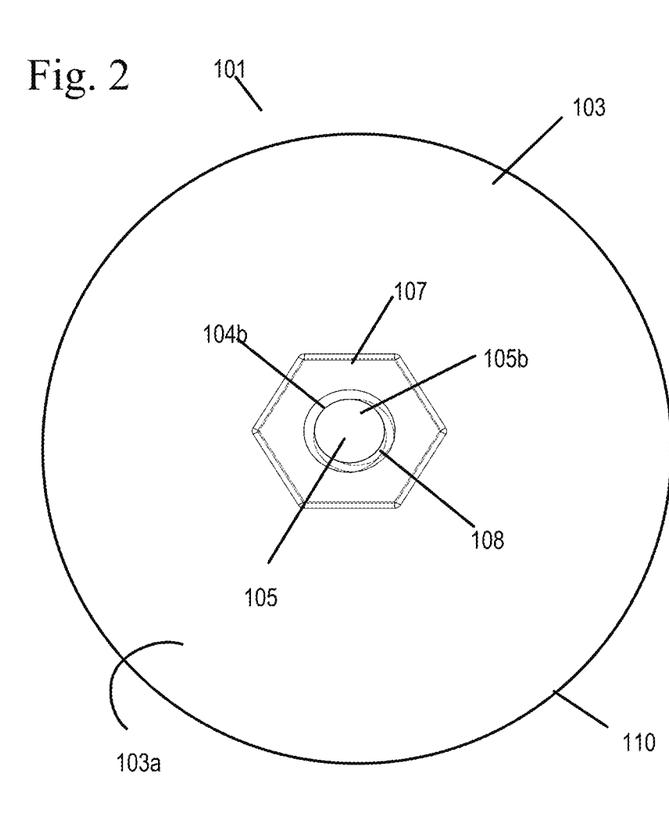
FIG. 2 shows another side view of the stagger wheel showing the second disk.
Figure 9:
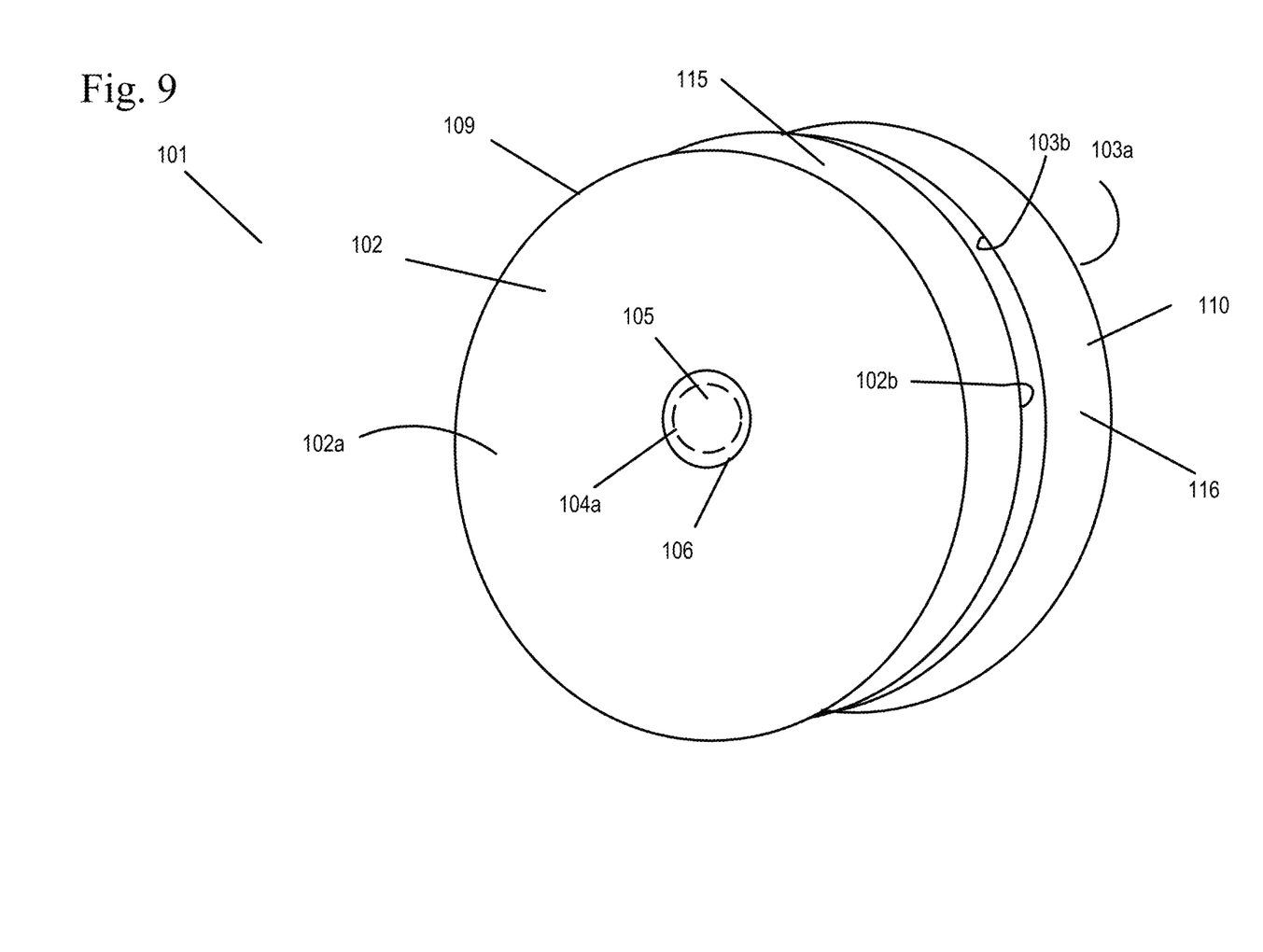
FIG. 9 shows a perspective view of the stagger wheel.

FIGS. 1, 2, and 9 show a stagger wheel 101 of an embodiment of the present invention. It is noted that FIG. 9 shows the two disks 102, 103 of the stagger wheel 101 separated slightly for illustration purposes only.

The stagger wheel 101 has a first disk 102 and a second disk 103 which are each mounted on a shaft 105. The shaft 105 is received within a centrally located bore 104a of the first disk 102 and centrally located bore 104b of the second disk 103.

The first disk 102 can rotate independently relative to the second disk 103. The shaft 105 is secured to the first disk 101 by a flat 106 and to the second disk 103 by a nut 107. More specifically, the shaft 105 has a first shaft end 105a connected to a flat head 106 having a circumference larger than the circumference of the centrally located bore 104a and a second shaft end 105b with threads 108 which can receive a nut 107. Other methods of securing the first and second disks 102, 103 to the shaft 105 can also be used as long as the first disk 102 and the second disk 103 can rotate on the shaft 105 independently of each other.

The first disk 102 has a first face 102a, a second face 102b opposite the first face 102a and an outer circumference 109. The outer circumference 109 has indicia 115 (shown in FIGS. 2-6). The first disk 102 has stagger indicia 115 indicative of the stagger in a range of 0-10 inches (0-25.4 cm) delineated into increments of 0.0625 inches (0.15 cm). It is noted that while the measurements are shown in inches, the metric system of measurement can also be used without departing from the scope of the invention.

The second disk 103 has a first face 103a, a second face 103b opposite the first face 103a and an outer circumference 110. The outer circumference 110 has indicia 116. The second disk 103 has tire indicia 116 indicative of the outer circumference of the left or right rear tire of a vehicle. In one embodiment, the range is 84 inches to 94.5 inches (216.36 cm-240.03 cm) in 0.0625 inch (0.15 cm) increments. The range and the division of the inch in increments can be varied from the amounts shown. It is noted that while the measurements are shown in inches, the metric system of measurement can also be used without departing from the scope of the invention.

It is noted that the second face 102b of the first disk 102 and the second face 103b of the second disk 103 are adjacent while mounted on the shaft 105.

Figure 10:
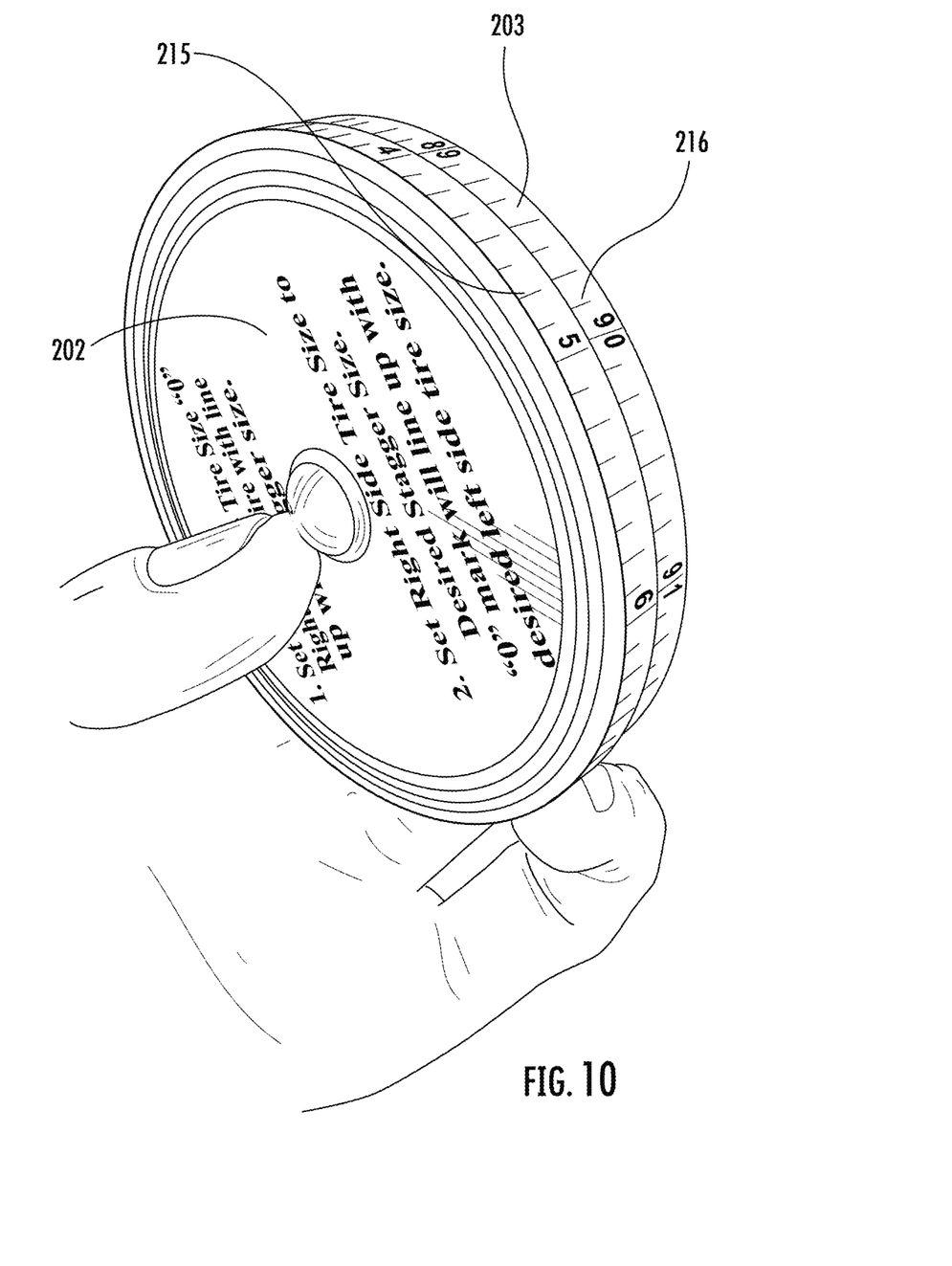
FIG. 10 shows a stagger wheel with alternate increments for the indicia on the first disk and second disk.
Figure 11:
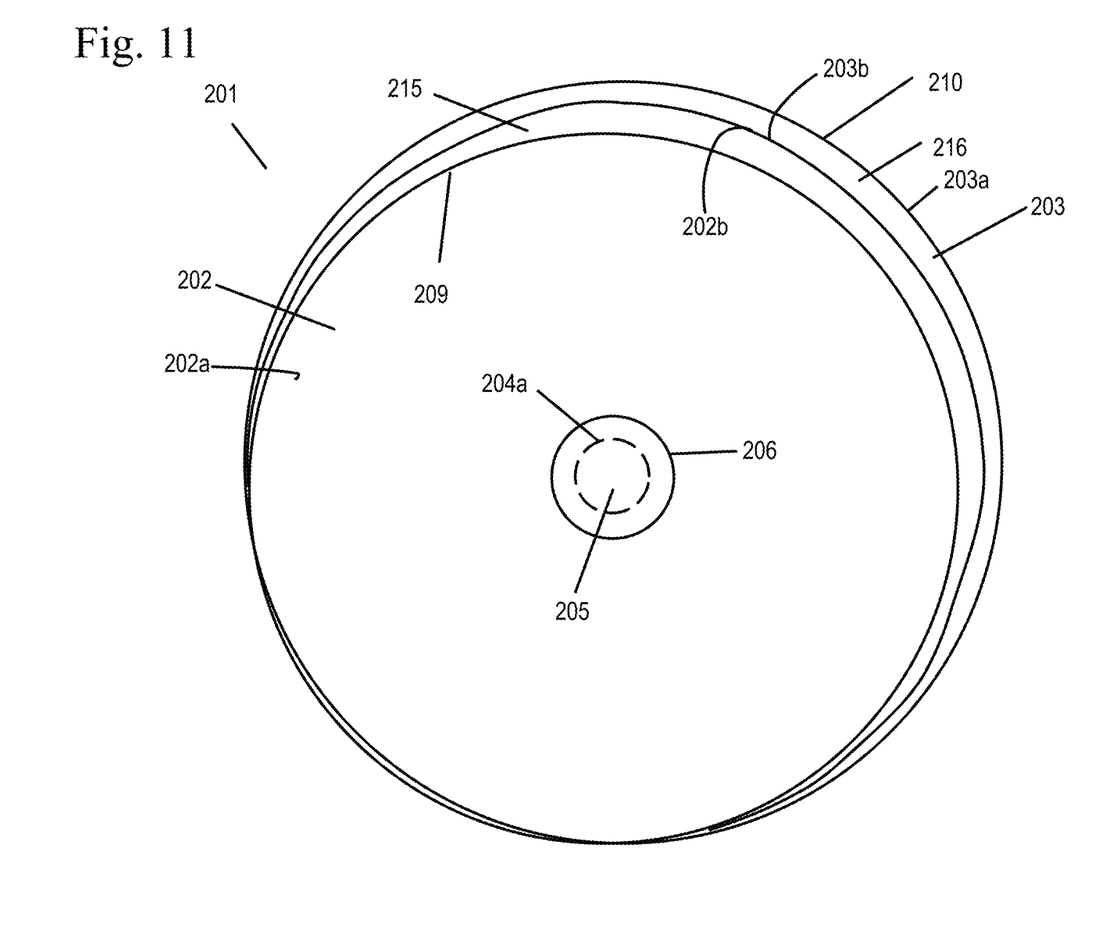
FIG. 11 shows the stagger wheel of FIG. 10.

FIGS. 10-11 shows another embodiment of the stagger wheel 201. The stagger wheel 101 has a first disk 202 and a second disk 203 which are each mounted on a shaft 205. The shaft 205 is received within a centrally located bore 204a of the first disk 202 and centrally located bore 204b of the second disk 203. The shaft 205 in this embodiment is part of sex bolt 206, also known as a Chicago binding screw and post. The sex bolt 206 has a nut with a barrel-shaped flange and protruding boss that has female threads. The male threaded screw is received within the protruding boss. Both the nut and the screw each have heads design to clamp the material or this case disks 202, 203 of the stagger wheel 201, therebetween. The style of head of the nut and screw can be a truss, button, flat, grommet, hex, low profile, oval, rivet or T-head flat.

The first disk 202 has a first face 202a, a second face 202b opposite the first face 202a and an outer circumference 209. The outer circumference 209 has indicia 215 (shown in FIG. 10). The first disk 202 has indicia 215 indicative of the stagger in a range of 0-10 inches (0-25.4 cm) delineated into increments of 0.125 inch (0.3175 cm). It is noted that while the measurements are shown in inches, the metric system of measurement can also be used without departing from the scope of the invention.

The second disk 203 has a first face 203a, a second face 203b opposite the first face 203a and an outer circumference 210. The outer circumference 210 has indicia 216. The second disk 203 has indicia 216 indicative of the outer circumference of the left or right rear tire of a vehicle. In one embodiment, the range is 84 inches (213.36 cm) to 94 inches (238.76 cm) in 0.125 inch (0.3175 cm) increments. The range and the division of the inch in increments can be varied from the amounts shown. It is noted that while the measurements are shown in inches, the metric system of measurement can also be used without departing from the scope of the invention.

It is noted that the second face 202b of the first disk 202 and the second face 203b of the second disk 203 are adjacent while mounted on the shaft 205 of the sex bolt 206.

Figure 7:
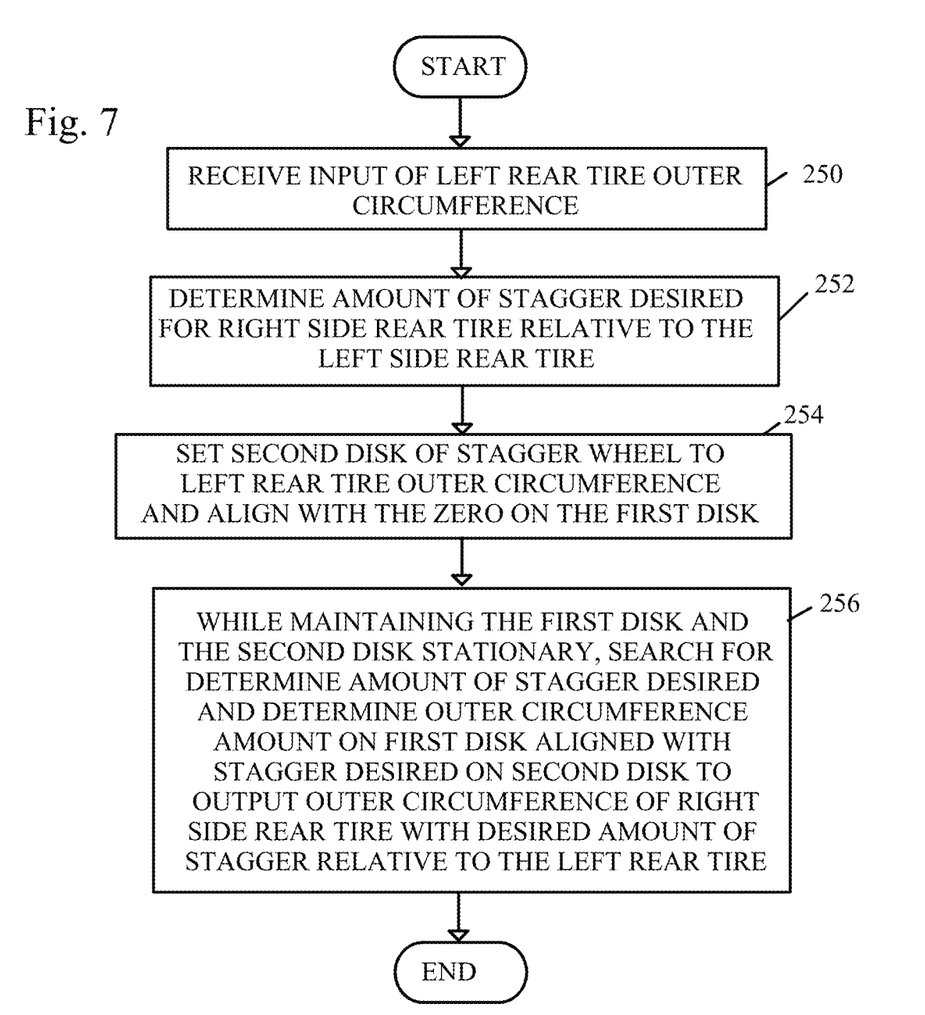
FIG. 7 shows a method of determining the right rear tire outer circumference based on the left rear tire outer circumference and desired stagger.

FIG. 7 shows a method of determining the right rear tire outer circumference of a vehicle based on the left rear tire outer circumference of the vehicle and desired stagger.

In a first step (step 250), a user receives input of the left rear tire outer circumference of a vehicle.

Next the user determines the amount of stagger desired for the right rear tire of the vehicle relative to the left rear tire of the vehicle (step 252).

The user sets the second disk 103, 203 of the stagger wheel 101, 201 to the left rear tire outer circumference through rotation of the second disk 103, 203 on the shaft 105, 205 and aligns the left rear tire outer circumference to the indicia of zero on first disk 102, 202 (step 254).

While maintaining the first disk 102, 202 and the second disk 103, 203 stationary, searching for desired amount of stagger and determining the outer circumference amount on the first disk 102, 202 aligned with the desired stagger to output the outer circumference of the right side rear tire with the desired amount of stagger relative to the left rear tire (step 256) and the method ends.

Figure 3:
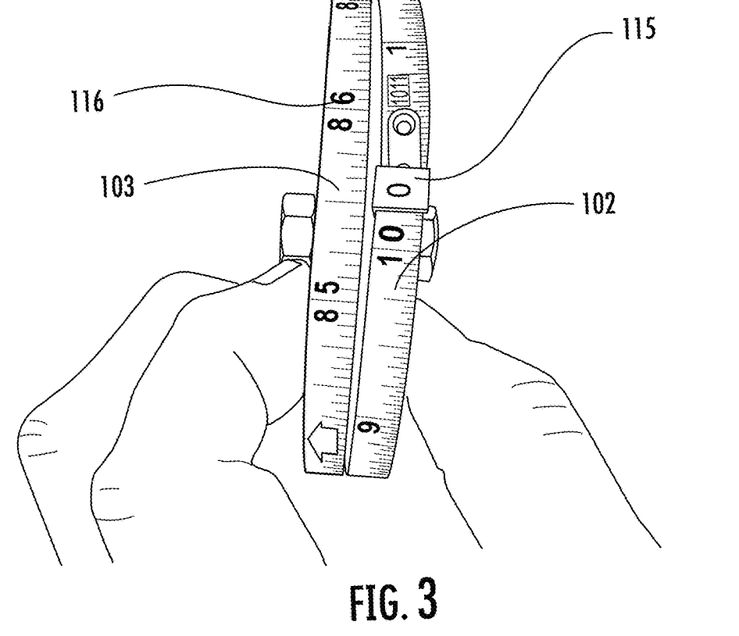
FIG. 3 shows the stagger wheel with the second disk set to the left rear tire outer circumference and the first disk set to zero.
Figure 4:
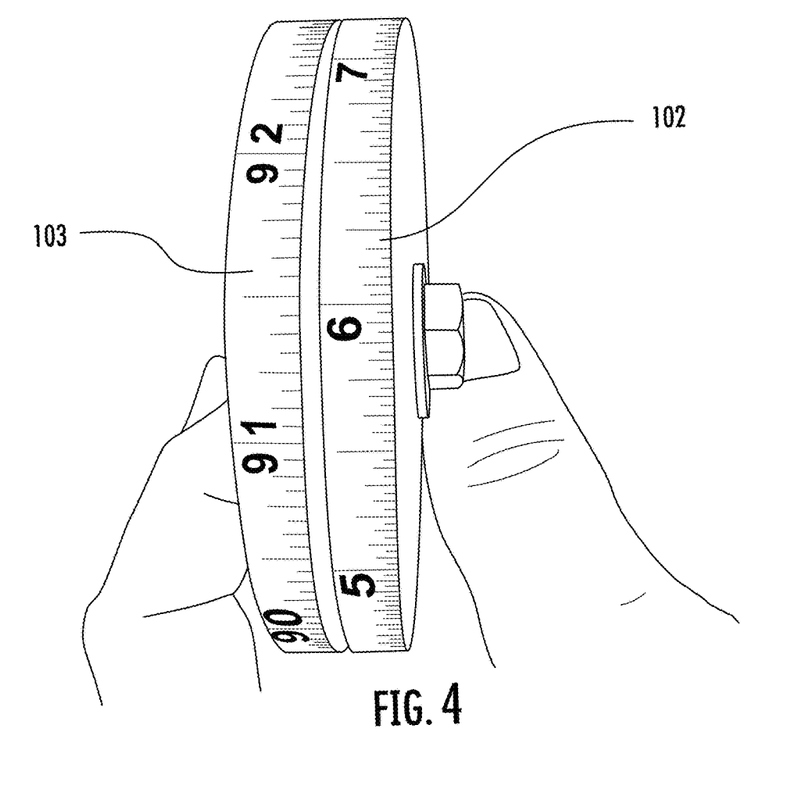
FIG. 4 shows the stagger wheel with the amount of stagger desired on the first disk and the corresponding outer circumference of the right rear side tire outer circumference.

For example, if a user had a left side rear tire with an outer circumference of 85.5 inches and desired 6 inches of stagger, the second disk 103 is set to 85.5 inches and aligned with the zero of the first disk 102 as shown in FIG. 3. While maintaining the first disk 102 and the second disk 103 stationary as shown in FIG. 4, the user looks for the number "6" on the first disk 102 and the corresponding aligned number on the second disk 103, which is 91.5 inches, the outer circumference of the right-side rear tire needs to be in order to achieve a stagger of six inches.

Figure 8:
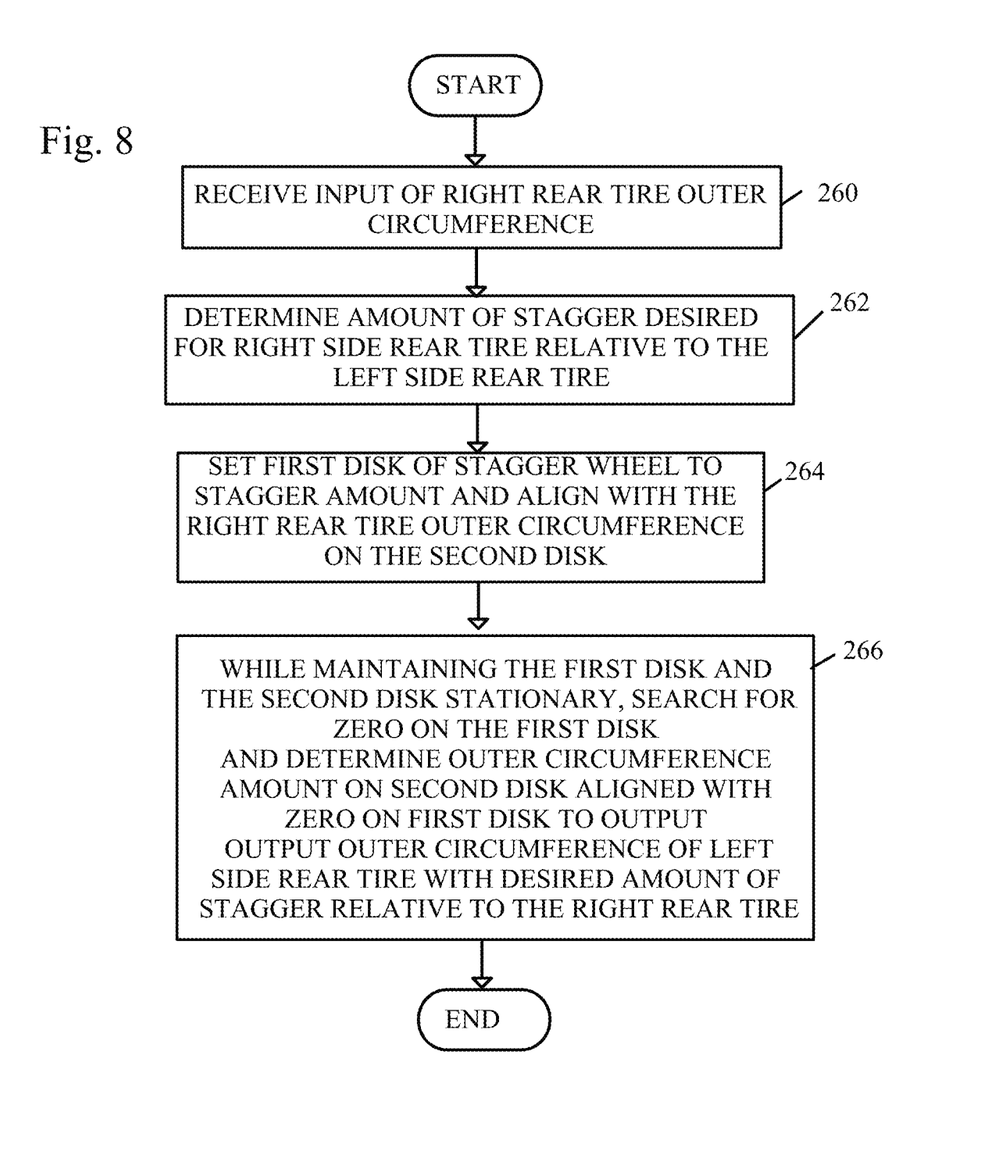
FIG. 8 shows a method of determining the left rear tire outer circumference based on the stagger and right rear tire outer circumference.

FIG. 8 shows a method of determining the left rear tire outer circumference based on the stagger and right rear tire outer circumference.

In a first step (step 260), a user receives input of the right rear tire outer circumference of the vehicle.

Next the user determines the amount of stagger desired for the right rear tire relative to the left rear tire of the vehicle (step 262).

The user sets the first disk 102, 203 of the stagger wheel 101, 201 to the stagger amount and aligns the stagger amount of the first disk 102, 202 with the right rear tire outer circumference on the second disk 103, 203 (step 264).

While maintaining the first disk 102, 203 and the second disk 103, 203 stationary, searching for zero on the first disk 102, 202 and determine outer circumference amount on the second disk 103, 203 which is aligned with the zero of the first disk 102, 202 to output the outer circumference of the left side rear tire with the desired amount of stagger relative to the right rear tire (step 266) and the method ends.

Figure 5:
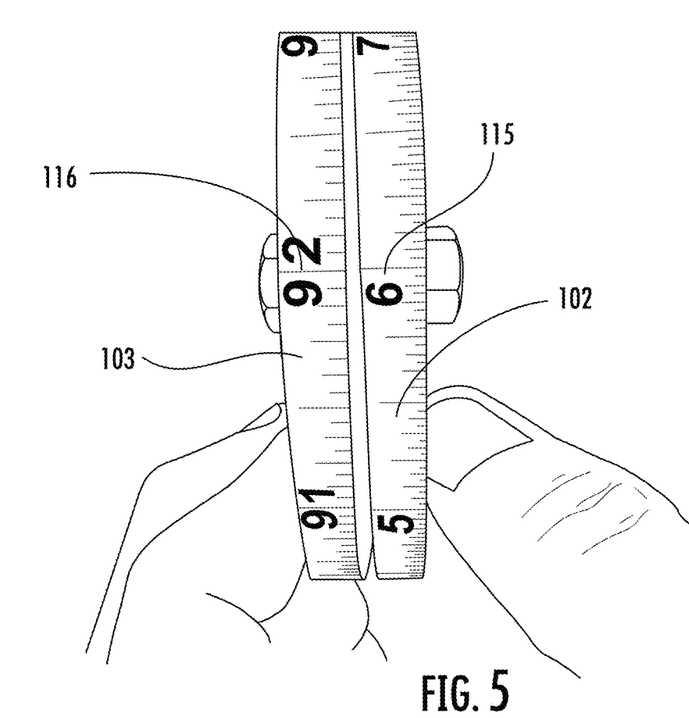
FIG. 5 shows the stagger wheel with the first disk set to the amount of stagger and the second disk set to the right rear tire outer circumference.
Figure 6:
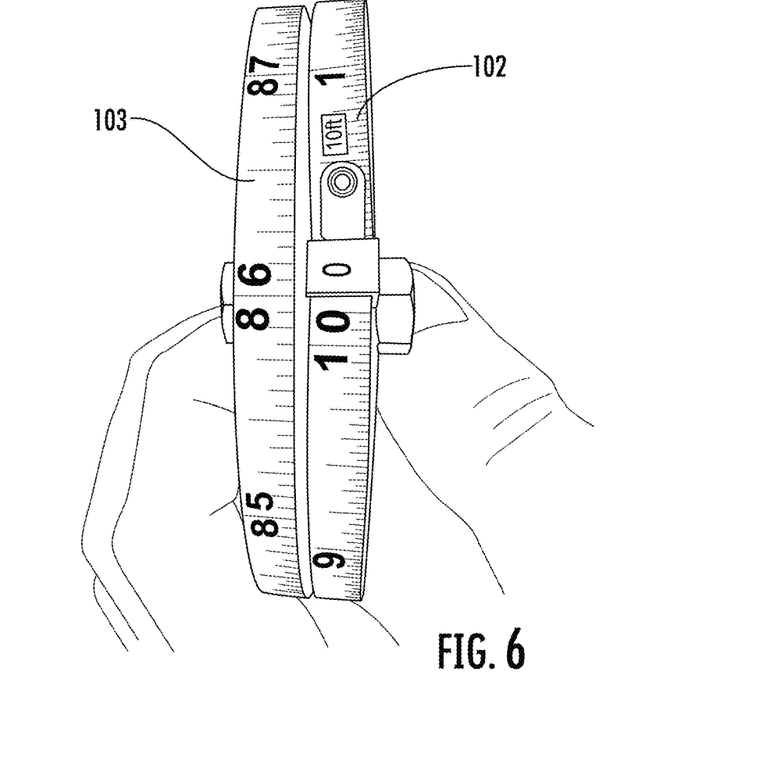
FIG. 6 shows the stagger wheel with the amount of the left rear tire outer circumference on the first disk aligned with zero on the second disk.

For example, if a user had a right side rear tire outer circumference of 92 inches and desired 6 inches of stagger, the second wheel 103 and the first wheel 102 are rotated such that 92 inches on the second wheel 103 is aligned with the "6" on the first wheel 102 as shown in FIG. 5. While maintaining the first disk 102 and the second disk 103 stationary as shown in FIG. 6, the user looks for the number "0" on the first disk 102 and the corresponding aligned number on the second disk 103, which is 86 inches, the outer circumference of the left side rear tire needed to be in order to achieve a stagger of six inches.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A stagger wheel comprising: a first disk defining a first disk bore and having a first face, a second face opposite the first face of the first disk, a first disk outer circumference comprising stagger indicia representing an amount of stagger; a second disk defining a second disk bore and having a first face, a second face opposite the first face of the second disk, a second disk outer circumference comprising tire indicia representing an outer circumference of a left rear tire or right rear tire; a shaft received within the first disk bore and the second disk bore, a first end of the shaft secured to the first face of the first disk and the second end of the shaft secured to the first face of the second disk; wherein the second face of the first disk is adjacent to the second face of the second disk and the first disk and the second disk rotate independently on the shaft.

2. The stagger wheel of claim 1, wherein the first end of the shaft comprises a head and the second end of the shaft is secured to the first face of the second disk with a nut.

3. The stagger wheel of claim 1, wherein the shaft is Chicago binding screw and post and first end of the shaft comprises a first head and the second of the shaft comprises a second head.

4. The stagger wheel of claim 1, wherein the tire indicia includes a range of 213.36-240.03 cm.

5. The stagger wheel of claim 1, wherein the stagger indicia includes a range of 0-25.4 cm.

6. A method of determining a right rear tire outer circumference of a vehicle based on a left rear tire outer circumference of the vehicle using a stagger wheel comprising:
receiving input of the left rear tire outer circumference of the vehicle;
determining an amount of stagger desired from the right rear tire of the vehicle relative to the left rear tire of the vehicle;
rotating a second disk of the stagger wheel, mounted on a shaft adjacent to a first disk of the stagger wheel to the left rear tire outer circumference of the vehicle represented by tire indicia on an outer circumference of the second disk, such that the tire indicia of the second disk representing the left rear tire outer circumference is aligned with a zero of a stagger indicia on an outer circumference of the first disk of the stagger wheel;
while maintaining the first disk and the second disk stationary, searching for the determined amount of stagger desired in the stagger indicia of the first disk and determining indicia on the second disk aligned with the determined amount of stagger desired in the stagger indicia of the first disk to output the right rear tire outer circumference for the vehicle corresponding to the amount of stagger desired and left rear tire outer circumference.

7. A method of determining a left rear tire outer circumference of a vehicle based on a right rear tire outer circumference of the vehicle using a stagger wheel comprising:
receiving input of the right rear tire outer circumference of the vehicle;
determining an amount of stagger desired from the left rear tire of the vehicle relative to the right rear tire of the vehicle;
rotating a first disk of the stagger wheel, mounted on a shaft adjacent to a second disk of the stagger wheel to the amount of stagger represented by stagger indicia on an outer circumference of the first disk of the stagger wheel, such that the stagger indicia representing the amount of stagger is aligned with tire indicia on an outer circumference of the second disk representing the right rear tire outer circumference;
while maintaining the first disk and the second disk stationary, searching for the zero stagger indicia on the outer circumference of the first disk and determining tire indicia on the second disk aligned with the zero of the stagger indicia of the first disk to output the left rear tire outer circumference for the vehicle corresponding to the amount of stagger desired and right rear tire outer circumference.

* * * * *